INVENTORS
WALTER J. SPIEGEL
PETER J. TEMBURRO
BY
Hodges
ATTY.

United States Patent Office 3,432,612
Patented Mar. 11, 1969

3,432,612
UNDERWATER CONNECTOR
Walter J. Spiegel and Peter J. Tamburro, Morris County, N.J., assignors, by mesne assignments, to the United States of America as represented by the Secretary of the Navy
Filed July 26, 1966, Ser. No. 568,072
U.S. Cl. 174—88          6 Claims
Int. Cl. H02g 15/08, 15/24

ABSTRACT OF THE DISCLOSURE

A multiple contact watertight cable connector having a pin receiving female part which has a removable cap to provide ready access for securing the connection between the cable sections. This securing is provided for by having the pin from the male member extend through the female members to be readily accessible from the capped end of the female member.

---

Figure 1:
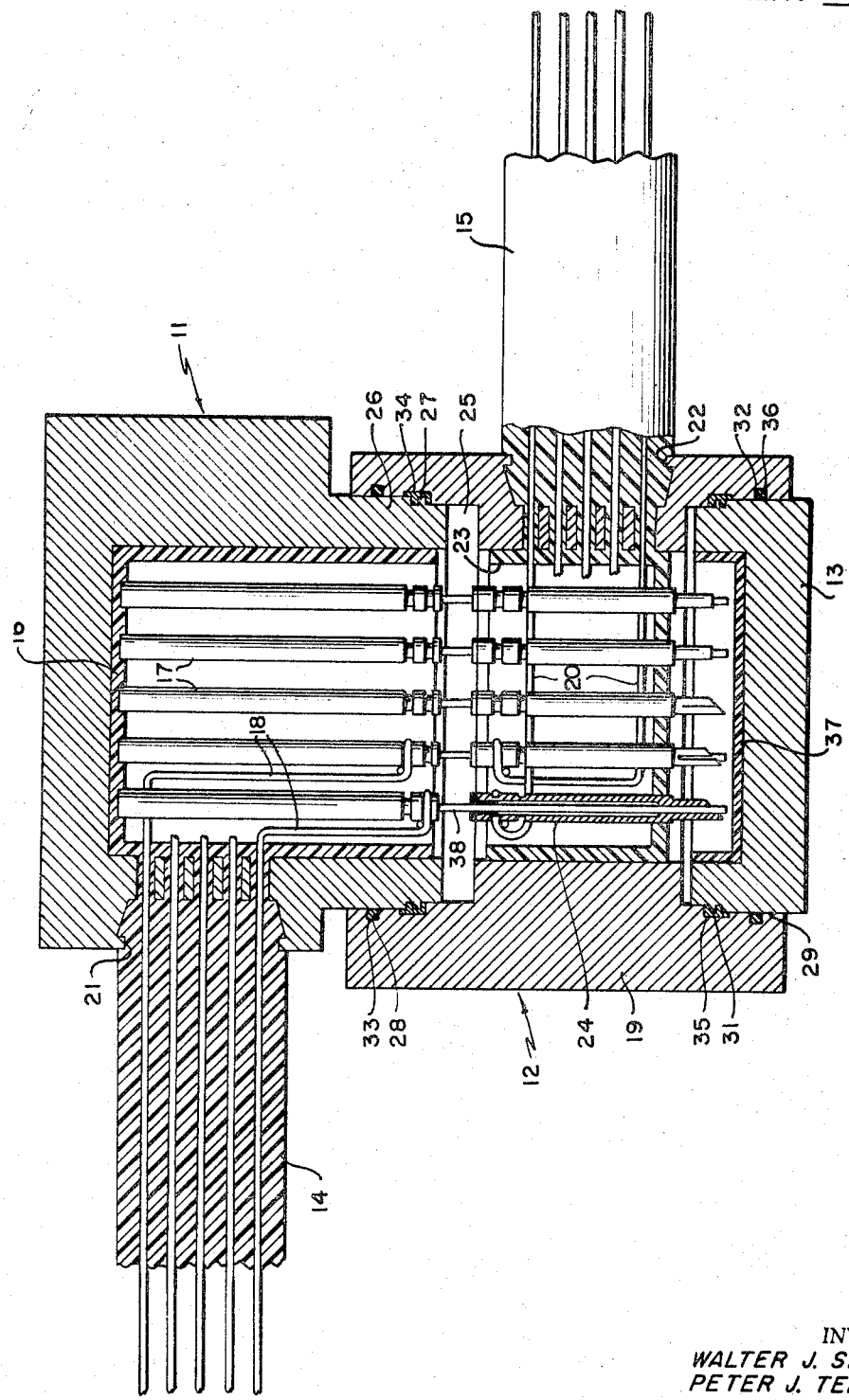

The present invention relates to a multiple terminal waterproof connector for cables. It is designed for use in an environment of high pressure and to be left in place for an extended time.

The prior art in this field has largely relied upon frictional contact between the contact elements of the connector. Alternatively, the process of connecting cable sections together by soldering each connector pair has been rather tedious and time consuming, if such connectors are not used to speed up the process. One of the disadvantages of the frictional connection type of connector has been that over periods of time oxides and corrosion products form which tend to introduce electrical noise into the circuits, especially where such circuits are utilized with highly sensitive electronic devices.

It is therefore an object of this invention to provide a waterproof cable connector for connecting a cable having a plurality of conductors.

It is a further object of this invention to provide a cable connector having a very low noise factor.

It is another object of this invention to provide a watertight connection between the sections of cables to be joined.

It is a further object of one modification of this connector to provide a connection having the minimum number of connections interposed to connect each wire between the two cables.

Figure 2:
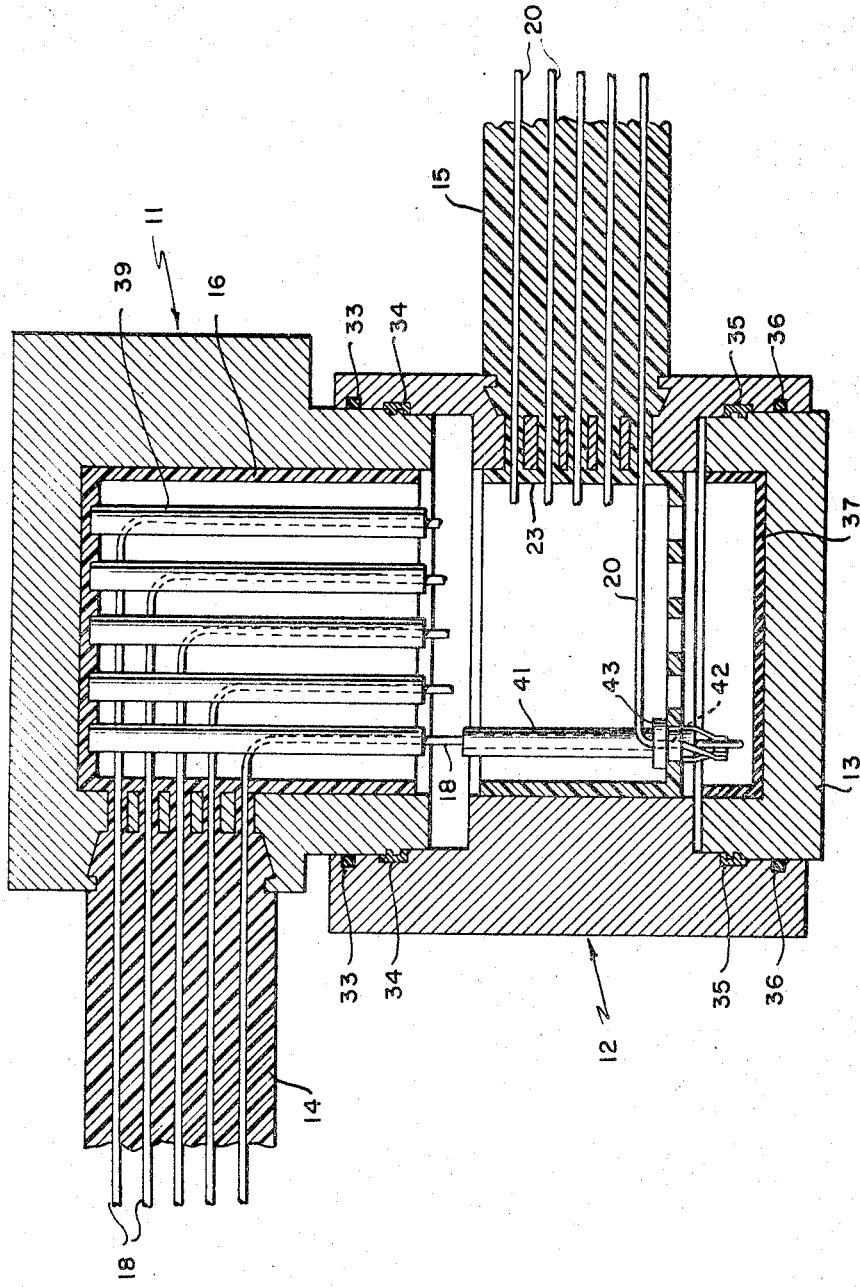

Other objects and many of the advantages of this invention will be readily appreciated as the device becomes better understood by reference to the following detailed description when considered in connection with the accompanying drawings in which like reference numerals designate like parts throughout the figures thereof and wherein:

FIG. 1 is a sectional view of the connector showing the details of the structure; and FIG. 2 is a cross-section of a modification of the connector of FIG. 1 in which the specific method of connecting the wires is illustrated.

Referring now to the drawings there is shown in FIG. 1 a water tight cable connector having a male body portion 11 and a female body portion 12 and a cover portion 13. The body portions 11 and 12 are water tightly connected to the cables 14 and 15 to be joined as by molding the cables into the body portions in a polyethylene compound. The body portions 11 and 12, as well as the cover portion 13, may be made of metallic material of sufficient strength to withstand the high pressures of the environment to which the connector is expected to be subjected. One of the body members, for example, body portion 11 may be constructed as a cup into which the cable 14 is attached through an opening 21 in the side of the cup and in which the cup is lined with an insulating material as at 16. Mounted within the cup in male member 11 are a plurality of electrically conductive pin members 17 to which the lead wires 18 from the cable 14 are attached in a one to one relationship. This connection between the wires from the cable and the pin members may be soldered or welded or the like. After the attachment of the leads from the cables to the pin members the cavity may be then potted with a potting compound to maintain the pin members in fixed relationship. Referring now to the female body mamber 12 which is constructed basically of a tubular metallic body 19 having an opening 22 in a side wall through which the cable is permitted to enter the body member 12. Within this body 19 is mounted an insulating cup member 23 and a plurality of spaced tubular electrically conductive pin receiving means 24. These tubular pin receiving means are connected to the leads 20 from cable 15 in a one to one relationship as by soldering or welding or in some other manner which produces a noise free connection between the member and the lead 20, as in the case of the male pin members. After being properly positioned, the pin receiving means 24 may be potted as were the pin members 17. The body member 12 is configured and has an enlarged bore 25 in one end of body 19 to receive a reduced portion 26 of the male body member 11. The enlarged bore of the body 19 has grooves 27 and 28 for receiving sealing members 33 and 34 to provide a water tight seal between body members 11 and 12. The other end of body 19 has an enlarged bore 29 to receive a cap member 13 and contains the appropriate grooves 31 and 32 to receive the sealing members 35 and 36 for providing a water tight seal between the cap member 13 and body member 12. Cap member 13 is shaped like a shallow cup and has an insulating lining 37. The pin receiving means 24 extends through the cup member 23 so that when the pin 38 is inserted through the pin receiving means 24, the end of pin 38 and of the receiving means 24 are positioned so that they may be of crimped or soldered or welded or fastened together in any other suitable way.

Each of the body portions is prepared by having the leads from the cable soldered to their respective pins and pin receiving means and being then filled with a potting compound. The connector is then assembled by fitting body member 12 over the reduced portion of body member 11 and then applying the cap member 13 to the enlarged bore portion of body member 12. This last step being accomplished after the pins have been fastened to the pin receiving means either by soldering or welding or by other suitable means. The whole assembly may be held together by any suitable clamping or screw fastening means, not shown.

FIG. 2 shows the modification of the connector of FIG. 1 in which the pin members 17 and the pin receiving members 24 are replaced by insulating tube members 39 and 41. In this arrangement the lead wires 18 from cable 14 in the male body member are passed through the sleeve members 39 to form the pins which in the mating of the male and female parts are then passed through the tube members 41 to extend beyond the tube member 41 for attachment to corresponding leads from cable 15. The leads from cable 15 are brought into the female portion 12 of the connector and passed through holes 42 in the flanges 43 on the tubes 41 in a one to one relation. The end of the leads from cable 15 are then fastened to the leads 18 which have been threaded through from cable 14 in a one to one relation to form a connection between the two cables. It is noted that the construction of the connector of this present invention allows electrical test to be made on the cable connections before the connections are permanently joined.

Obviously many modifications and variations of the present invention are possible in the light of the above teachings. It is therefore to be understood, that within the scope of the appended claims, the invention may be practiced otherwise than as specifically described.

What is claimed is:

1. A cable connector for cable sections having a plurality of conductors comprising:
   a male member having a watertight connection to one cable section;
   a plurality of pin means corresponding in substantially a one to one relation with and connected to the conductors of said one cable section and mounted in said male member;
   a female member having a watertight connection to the other cable section and having a plurality of pin receiving means connected to and corresponding in substantially a one to one relation with the conductors of the other cable section mounted therein;
   said female member being of a tube-like construction with both ends open, said pin receiving means being mounted longitudinally within said female member, said male and female members being connected together to form the connector, said pin receiving means being of such length that said pin means and said pin receiving means are secured together to form a connection between the cable sections;
   a cap member mounted on the end of said female member remote from said male member to cover the ends of said pin receiving means and being watertightly connectable to close the end of said female member, said pin means extending through said pin receiving means when said male and female members are joined whereby the conductors of one cable section may be secured to the conductors of the other cable section before said cap member is attached.

2. A cable connector as claimed in claim 1 in which said male member is cup shaped and is lined with an insulating material and in which said cable enters said cup and is secured to said cup through a hole in the side wall of said cup.

3. A cable connector as claimed in claim 2 in which said pin means includes a plurality of insulating tubes mounted longitudinally within said male member through which the conductors of said one cable section extend.

4. A cable connector as claimed in claim 1 in which each of said pin receiving means comprises an insulating pin receiving tube having a flange with a hole in said flange through which said conductor from said other cable section is passed, said pin receiving tube receiving said pin means through it when said male and female parts of said connector are connected together.

5. A cable connector as claimed in claim 1 in which said pin receiving means is a tubular conductor to which the conductors from said other cable section are attached.

6. A cable connector as claimed in claim 1 wherein said pin means includes a plurality of insulating tubes mounted longitudinally within said male member through which the conductors of said one cable section extend and constitute the pins and said pin receiving means comprises an insulating pin receiving tube having a flange with a hole in said flange through which said conductor from said other cable section is passed, said pin receiving tube receiving said pin means through it when said connector is connected together, whereby there is required a minimum of circuit connections within said connector between the respective conductors of said cable sections.

References Cited

The Radio-Electronic Master, 22nd edition, 1958, United Catalog Publishers, Inc. 60 Madison Ave., Hempstead, N.Y., p. F–293. Copy in Group 215.

DARRELL L. CLAY, *Primary Examiner.*

U.S. Cl. X.R.

174—87, 21; 339—94, 176